United States Patent
Tonyali et al.

[19]

[11] Patent Number: 6,066,377
[45] Date of Patent: May 23, 2000

[54] LAMINATED AIR BRAKE TUBING

[75] Inventors: Koksal Tonyali, Mason; Edward A. Green, Mantua; Glenn M. Gregrich, Stow; Iani Manas, Orange, all of Ohio

[73] Assignee: Furon, Laguna Niguel, Calif.

[21] Appl. No.: 09/135,141

[22] Filed: Aug. 17, 1998

[51] Int. Cl.[7] .................................................. B32B 1/08
[52] U.S. Cl. .................. 428/36.3; 428/36.91; 138/125; 138/126; 138/141; 138/137
[58] Field of Search ................................. 428/36.3, 36.9, 428/36.91, 476.1, 36.2, 36.4; 138/137, 125, 126, 140, 141, 124; 361/215

[56] References Cited

U.S. PATENT DOCUMENTS

| | | | |
|---|---|---|---|
| 3,601,524 | 8/1971 | Kauffman | 174/74 |
| 3,814,138 | 6/1974 | Courtot | 138/124 |
| 4,196,464 | 4/1980 | Russell | 361/215 |
| 4,308,896 | 1/1982 | Davis | 138/126 |
| 4,717,326 | 1/1988 | Motonaga et al. | 425/133.1 |
| 5,076,329 | 12/1991 | Brunnhofer | 138/137 |

FOREIGN PATENT DOCUMENTS

| | | |
|---|---|---|
| 84014058 | 4/1984 | Japan . |
| WO 97/44186 | 11/1997 | WIPO . |

*Primary Examiner*—Ellis Robinson
*Assistant Examiner*—Laura L. Lee
*Attorney, Agent, or Firm*—Wood, Herron & Evans, LLP

[57] ABSTRACT

A laminated air brake tubing includes inner and outer nylon layers with an intermediate fiber reinforcing layer. The tubing further includes one and preferably two layers of high density polyethylene positioned adjacent either of said nylon layers. The polyethylene layers are cross-linked preferably by irradiation. Further, the high density polyethylene layer may include compatibilizing agents preventing delaminating. The air brake tubing of the present invention meets the current requirements for air brake tubing, however it is less expensive than currently available air brake tubing.

9 Claims, 1 Drawing Sheet

LAMINATED AIR BRAKE TUBING

BACKGROUND OF THE INVENTION

Air brake systems are frequently employed for heavy-duty vehicles such as tractor trailers and the like. In such systems, the brake system is activated by pressurized air transported through tubing. Metal tubing, of course, can be employed. However, generally nylon tubing is used and in many applications, reinforced nylon tubing is required. By industry standards, reinforced nylon tubing must include an inner nylon layer and an outer nylon layer with an intermediate polyester or nylon reinforcing layer. This tubing is designed to operate at a maximum pressure of 150 psi over a wide temperature range i.e. −40° C. to 90° C. The test requirements are even more strenuous requiring the tubing to withstand 150 psi pressure at temperatures from −40° C. up to 110° C.

In the past, such polyester reinforced nylon tubing has performed quite well. It meets the minimum requirements with respect to temperature and pressure and generally exceeds these. In certain applications, it may be desirable to further broaden the temperature characteristics of such tubing. Further nylon itself is relatively expensive. High density polyethylene (HDPE) on the other hand has a very good temperature range and is significantly less expensive than nylon. Nylon has been utilized for an extended period of time in automotive and trucking applications and therefore it's characteristics with respect to fuel stability and the like are well known. Therefore air brake tubing still requires that the inner and outer layers be nylon.

If one were to simply utilize a layer of high density polyethylene within the reinforced nylon brake tubing, in turn reducing the amount of nylon, the formed product will tend to delaminate if repeatedly subjected to high pressures. In effect, stress cracking occurs where the polyester strands cross and contact the HDPE layer.

SUMMARY OF THE INVENTION

Accordingly, it is an object of the present invention to provide a laminated, reinforced tubing which does not delaminate. Further, it is an object of the present invention to provide such a laminated air brake tubing that has improved low temperature characteristics. Further, it is an object of the present invention to provide such a laminated tubing utilizing layer of a polyolefin preferably high density polyethylene, HDPE.

The present invention is premised on the realization that such a tubing can be formed wherein any polyolefin layer adjacent the reinforcing layer is cross-linked. Preferably, according to the present invention, such a laminated tubing includes an inner layer of nylon, an intermediate cross-linked HDPE layer, a braided polyester layer, and an outer nylon layer.

In a preferred embodiment of the present invention, the laminated tubing includes two layers of cross-linked HDPE, one on either side of the polyester braiding. In turn the nylon layers include stabilizing agents to prevent radiation induced degradation.

The objects and advantages of the present invention will be further appreciated in light of the following detailed descriptions and drawing in which:

DETAILED DESCRIPTION

Figure 1:
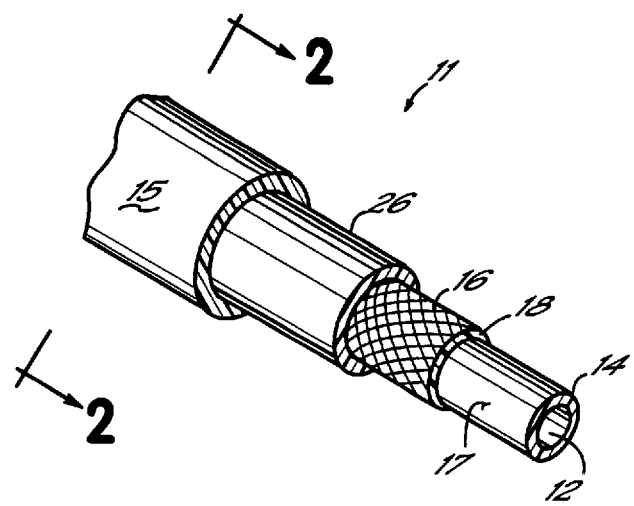
FIG. 1 is a fragmentary prospective view of air brake tubing made according to the present invention.
Figure 2:
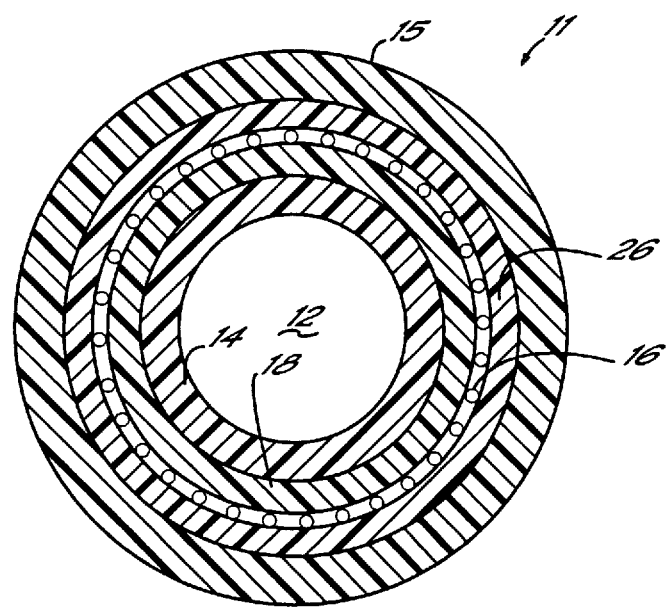
FIG. 2 is a cross-sectional view taken at lines 2—2 of FIG. 1.

As shown in the drawings, the present invention is an air brake tubing 11 which has a central inner passageway 12 having a diameter generally from about 0.251 to about 0.556 inches. Tubing 11 has an inner nylon layer 14 and an outer nylon layer 15 with a central layer of fiber reinforcement or braiding 16.

Tubing 11 further includes a first layer 18 of polyolefin which has a thickness of about 0.024 to 0.039 inches. Generally for brake tubing the polyolefin will be high density polyethylene. However, for other applications, low density polyethylene, polypropylene or polybutylene may be employed. This is bonded to the outer surface 17 of inner nylon layer 14.

A second layer 26 of polyolefin again preferably HDPE is located between braiding 16 and outer nylon layer 15. Only one layer of polyolefin is required. However the two layers 18 and 26 are preferred.

Both inner and outer nylon layers have a thickness of about 0.005 to about 0.010. Likewise, for brake tubing applications both layers of polyolefin have a thickness of about 0.024 to about 0.039 inches.

The nylon layers are generally formed from nylon 11 or nylon 12. Commercially available plasticized polyamide such as plasticized nylon 11 (ELF ATOCHEM Brand RIL-SAN BNSO P40TL) or plasticized nylon 12 (EMSER brand GRILAMID L25W40NZ) can be utilized in the invention. In addition alloys of nylon 11 and/or nylon 12 can be employed. These alloys, include nylon blended together with less than 50% by weight of a compatible polymer such as high density polyethylene. Hereinafter the term nylon is intended to include both 100% nylon as well as comparably performing nylon blends or alloys.

HDPE is generally cross-linked through a free radical mechanism. These free radicals can be initiated by various mechanisms such as radiation or peroxides or the like. Generally the HDPE is purchased with the desired cure package.

In one embodiment the polyolefin will be radiation crosslinked. Therefore stabilizers, such as polymeric hindered amines available from Cytec Industries are preferably added to the polyamide composite. Preferably from about 0.5% to about 1.0% of the stabilizers are added to the composite in order to inhibit degradation of the polyamide during irradiation. Other suitable stabilizers beside the hindered amines are hindered phenolics. If other modes of crosslinking are employed the stabilizers may not be required.

In the preferred embodiment of the present invention, the polyolefin layer will be high density polyethylene as well as comparably performing nylon/polyethylene blends or alloys. Generally, the nylon content of any polyethylene blend can be up to about 50% by weight. The high density polyethylene has a density of about 0.94 to about 0.96 and a melt index of 0.01–3.0. It may include suitable stabilizers, processing aids and the like which are typically added to polyethylene. Further, the polyethylene can include a compatibilizing agent to enhance the bonding between the polyamide and the polyethylene layers. A suitable compatibilizing agent is maleic anhydride modified polyolefin.

Preferably the high density polyethylene utilized in the present invention includes from about 40 to 98% high density polyethylene from about 1 to 30% compatibilizing agent and from about 0.05 to about 5% stabilizer or concentrate (e.g., a concentrate with 30–40% stabilizer) and an effective amount of a desired cure promoter. Preferred high density polyethylenes are sold by Exxon Chemical under the name Escorene HD9856B. A suitable compatibilizing agent is Uniroyal's Polybond brand 3009 which has up to 1% maleic anhydride grafted onto high density polyethylene. The stabilizer is about 30 to 99% high density polyethylene combined with 0.5 to 70% of an antioxidant or blend of antioxidants such as Irganox 1010 supplied by CIBA Specialty Chemicals. The cure promoter can be any cure promoter typically employed for the selected polyolefin. One preferred curing mechanism is radiation cross linking. If this cure mechanism is employed the polyolefin will include 0.5 to 10% of a radiation cure promoter such as Sartomer SR 350 which is a trimethylol propane-trimethacrylate. Heat activated curing agents can also be employed but are less preferred.

Preferably, the stabilizer concentrate consists of:

| | |
|---|---|
| HDPE-LR7320 | 86.5% |
| Antioxidant - Vanax ® ZMTI | 7.5% |
| Antioxidant - Irganox ® 1010 | 5.0% |
| Cure Promoter - Sartomer SR350 | 1.0% |

These components are dry blended together and then extruded to form the high density polyethylene layers.

The reinforcing or braiding layer is generally formed from strands of polymeric fibers and preferably polyester fibers. These should have a weight of 500–1000 denier, with 840 denier being preferred. Commercially available polyester fiber is sold by Hoechst Cellanese under the designation 500 denier and 840/70/VAR.

To form the tubing 11 of the present invention, the inner nylon tube 14 is coextruded along with the polyolefin or high density polyethylene layer 18. The melt temperature of the nylon extruder should be 440° F. to about 460° F. preferably 450° F. The melt temperature of the polyethylene extruder which is preferably a 2½ inch single screw extruder is 400° F. to 450° F., preferably 420° F.

The braiding 16 is then applied over the polyolefin layer 18 by passing the two layer extruded tubing through a braider or fiber reinforcing apparatus. The reinforcing material may be braided, knitted, or spirally wrapped wherein one strand of the material is applied in a pitch to one direction and another strand is applied over the first with a pitch to the opposite direction. The braider is preferably a counter rotating fiber reinforcing device or may be any suitable and known conventional braiders. Preferably the braided layer 16 is applied with 6 total bobbins of fiber applied from 2 to 5 pics per inch, preferably 3 pics per inch.

Once the braiding is applied, the outer two layers are coextruded over the inner tubing in the same manner as the inner two layers at the same temperatures. This can then be passed through a cooling bath. The resulting extruded product has an outer diameter of about 0.125 to about 0.75 inches.

The formed tube is then cross-linked. The presently preferred method of affecting cross-linking of the components of the multi-layer hose is by exposure to high energy electrons. Any suitable source of high energy electrons such as an insulating core transformer, a resonant transformer or a linear accelerator can be used to provide the high energy electrons. The physical properties of the hose are usually improved sufficiently with a dosage of 5–20 megarads. However, seldom will it be necessary to expose the components of the hose to a total dosage of more than 10 megarads. It is preferred that the required dosage be effected in one exposure but repeated exposures can be made until the desired total dosage has been obtained. Again other cure mechanisms can be employed such as peroxides and the like.

As shown more specifically in the Examples below, cross-linking improves the high temperature resistance of the polyethylene layer (see hot creep data set forth in Examples 1–2). Moreover, curing also improves adhesion by 20% between the relatively thin polyamide layers and thicker polyethylene layers. Accordingly, the air brake tubing of the invention exhibits excellent bonding properties for long periods of use.

The present invention is further illustrated by the following examples in which the parts of the specific ingredients are by weight (pbw). It is to be understood that the present invention is not limited to the examples, and various changes and modifications may be made in the invention without departing from the spirit and scope thereof.

EXAMPLES

Example 1

Radiation Cross-Linkable HDPE's

The percentage of creep elongation and percentage of gel formation of a number of high density polyethylene compositions were evaluated at different radiation levels. The creep experiments were performed at 150° C. with a 29 psi uniaxial stress in an oven. The total creep elongation was measured after 15 minutes under a constant stress. In addition, the percent gel was determined by solvent extraction by ASTM D2765 test method. The results of these analysis are set forth below.

| Material | Radiation Level (Mrads) | % Gel | Hot Creep Elongation (%) |
|---|---|---|---|
| EB-01 | 0.0 | 0.0 | N/A |
| | 5.0 | 44.9 | 225.0 |
| | 7.5 | 57.9 | 110.0 |
| | 10.0 | 69.7 | 55.0 |
| | 15.0 | 80.9 | 35.0 |
| EB-02 | 0.0 | 0.0 | N/A |
| | 5.0 | 63.1 | 102.5 |
| | 7.5 | 64.9 | 65.0 |
| | 10.0 | 73.0 | 37.5 |
| | 15.0 | 79.3 | 27.5 |
| EB-03 | 0.0 | 0.0 | N/A |
| | 5.0 | 62.9 | 95.0 |
| | 7.5 | 64.9 | 60.0 |
| | 10.0 | 75.5 | 25.0 |
| | 15.0 | 78.4 | 22.5 |

N/A = Specimen Melted
Creep experiments performed for 15 min. at 150° C. with 29 psi uniaxial stress
Percent gel determined by solvent extraction
EB-01 = 89% HDPE, 10% Polybond, 1% AO Package
EB-02 = 88% HDPE, 10% Polybond, 1% AO Package, 1% SR-350
EB-03 = 87% HDPE, 10% Polybond, 1% AO Package, 2% SR-350
AO package = 5 parts Irganox 1010, 4 parts Agerite MA, 1 part DSTDP The data indicates that the higher the radiation level, the higher percent gel or the lower hot creep elongation. Percent gel relates to the cure level in the samples.

Example 2

Percent Gel

Tubes of Nylon 11/HDPE/Nylon 11 were made using the invention. The percent gel and swell ratio of a number of tubes with high density polyethylene compositions were determined by the method indicated above after 10 megarad radiation exposure. The results are as follows:

| Cure Promoters | Sample ID | Irradiation | % Gel in tube | % Gel in HDPE | Swell Ratio |
|---|---|---|---|---|---|
| w/o cure prom. | AB | E beam | 44.9 ±/− 0.5 | 28% | 2.8 |
| with cure prom. | BB | E beam | 52.8 ±/− 0.8 | 42% | 10 |
| w/o cure prom. | CU | not beamed | 28.4 ±− 0.6 | 0% | −0.6 |

The data demonstrates that irradiation introducing curing in polyamide/HDPE/polyamide tubes. Cure promoter improved the cross-linking in the HDPE layer.

Example 3

Nylon 11 and Nylon 11/HDPE/Nylon 11 tubes were cooled to −60° F. Both tubes were bent to determine low temperature characteristics. Nylon 11 tube cracked while the Nylon 11/HDPE/Nylon 11 tube kinked without cracking showing the 3 layer structure is superior in cold temperatures. Both tubes were also aged at 320° F. until they became brittle. Nylon 11 tubes shattered after 5 days of aging when the tube was bent. However, Nylon 11/HDPE/Nylon 11 tube cracked without shattering after 11 days of aging under the same test conditions. This result shows improved high temperature performance of the invented tubes.

Example 4

Low Temperature Impact Testing

A number of single layer and multi-layer slabs (0.215" thick bars, layer thickness ratio=1.0;3.5:1.0) were compression molded at 420° F. in order to evaluate the effectiveness (i.e. bonding, impact strength, etc.) of the present invention under low temperature conditions. The tests were performed at −70° C. according to ASTM D256, Method A. The following results were produced:

| Sample No. | Inner and outer layers | Intermediate Layer | Layer Bonding | Impact strength (ft-lbs/in) Unirradiated | Irradiated |
|---|---|---|---|---|---|
| 1 | N/A | Nylon 11 (Atochem) | N/A | 0.6 | 0.6 |
| 2 | N/A | Nylon 12 (Emster) | N/A | 0.8 | 1.0 |
| 3 | Nylon 11 | 90% LR 7320-00[1] 10% Polybond 3009 | Good | 0.9 | 1.1 |
| 4 | Nylon 11 | 45% LR 7320-00 45% Santoprene RC-8001 10% Polybond 3009 | Good | 0.7 | 0.5 |
| 5 | Nylon 12 | 90% LR 7320-00 10% Polybond 3009 | Good | 1.0 | 1.4 |
| 6 | Nylon 11 | 45% LR 7320-00 45% Santoprene RC-8001 10% Nordel 3730 | Good | 0.8 | 0.5 |

[1]LR 7320-00 is a blow molding grade high density polyethylene sold by Quantum.

These examples demonstrate the improved performance characteristics of the crosslinked laminated brake tubing of the present invention. The polyolefin layer improves the temperature characteristics of the tubing and the crosslinking prevents stress cracking and delamination. Further the stabilizers added to the nylon prevent radiation induced degradation of the nylon.

This, of course, has been a description of the present invention along with the preferred method of practicing the present invention known to the inventors.

However, the invention itself should be defined only by the appended claims wherein we claim:

1. A Delamination resistant air brake tubing comprising
   an inner nylon layer having an outer surface;
   a cross-linked polyolefin layer bonded to said outer surface of said inner nylon layer;
   a polyester fiber reinforcing layer bonded to an outer surface of said polyolefin layer;
   and an outermost nylon layer.

2. The Delamination resistant air brake tubing claimed in claim 1, further comprising a second cross-linked polyolefin layer bonded to said fiber reinforcing layer and to said outermost nylon layer.

3. The Delamination resistant air brake tubing claimed in claim 2 wherein said polyolefin layers are high density polyethylene.

4. The Delamination resistant air brake tubing claimed in claim 3 wherein said high density polyethylene is radiation cross-linked.

5. The Delamination resistant air brake tubing claimed in claim 4 wherein said nylon layers include stabilizers.

6. The Delamination resistant air brake tubing claimed in claim 5 wherein said stabilizers are hindered amines.

7. A Delamination resistant air brake tubing comprising an inner nylon layer and a polyester fiber reinforcing layer:
   a cross-linked polyolefin layer bonded to an outer surface of fiber reinforcing layer;
   an outermost nylon layer bonded to said cross-linked polyolefin layer.

8. The Delamination resistant air brake tubing claimed in claim 7 wherein said polyolefin layer comprises irradiation cross-linked high density polyethylene.

9. A Delamination resistant air brake tubing comprising an inner nylon layer having an outer surface a first radiation cross-linked high polyethylene density layer bonded to said outer surface of said nylon layer:

a polyester fiber reinforcing layer bonded to an outer surface of said high density polyethylene layer;

a second cross-linked high density polyethylene layer bonded to an outer surface of said fiber reinforcing layer;

and an outermost nylon layer bonded to said second radiation cross-linked polyethylene layer, wherein said nylon layers incorporate an effective amount of irradiation stabilizer.

* * * * *